Figure 1:
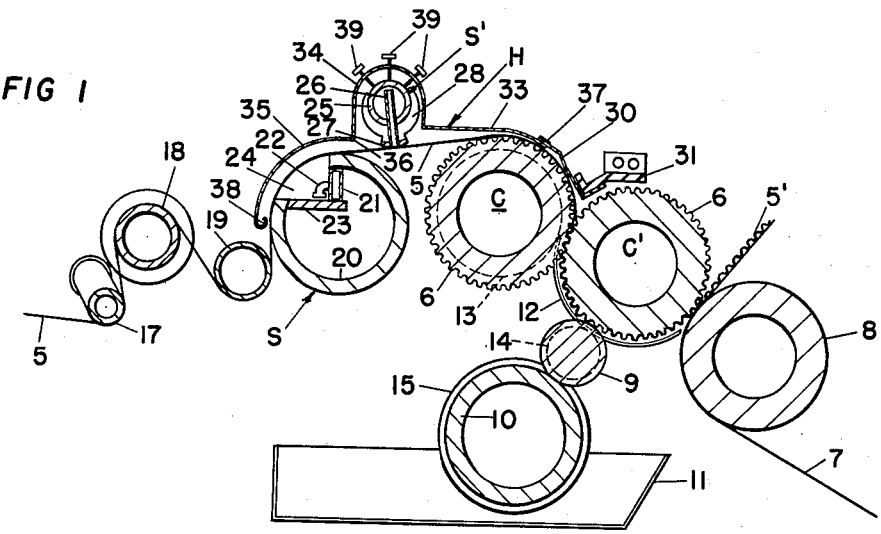

Aug. 17, 1954   W. HOWARD   2,686,555
MACHINE FOR PRODUCING CORRUGATED PAPER
Filed Oct. 6, 1952

INVENTOR.
Wilford Howard
BY
Lamphere & Van Valkenburgh
Attorneys

Patented Aug. 17, 1954

2,686,555

UNITED STATES PATENT OFFICE 2,686,555

MACHINE FOR PRODUCING CORRUGATED PAPER

Wilford Howard, Denver, Colo., assignor, by mesne assignments, to Central Fibre Products Company, Inc., Quincy, Ill., a corporation of Delaware Application October 6, 1952, Serial No. 313,273

6 Claims. (Cl. 154—31)

This invention relates to machines for producing corrugated paper.

In such machines, a stock which is to be corrugated is fed between intermeshing corrugating rolls, adhesive is applied to one side of the corrugated stock, such as during passage around the second corrugating roll, and additional stock to be attached to the corrugated layer is fed between a pressure roll and the second corrugating roll subsequent to the application of adhesive, so as to cause the latter stock or liner to adhere or be cemented to the corrugated layer. This produces a corrugated product having a single flat layer adhering to one side of a corrugated layer, and such a product may be used per se, although it is customary to apply additional adhesive to the opposite side of the corrugated stock and press a second liner thereagainst to cause the same to adhere or be cemented to such oppositte side. In addition, a composite corrugated paper may be made of several corrugated layers with flat layers alternating therebetween and adhering thereto. Such a composite structure may be built up from two or more combinations of a single corrugated layer having a flat layer adhering to one side thereof.

For the best results in producing a corrugated layer which will retain its shape during attachment to the liner and will retain its shape and stiffness afterward, precaution must be taken both in the treatment of the layer to be corrugated prior to passage between the corrugating rolls, and also in the selection of a suitable stock. Better results are generally obtained by using stock made from wheat straw, although other materials can be mixed therewith, such as to provide a stock having from 40% to 60% wheat straw and the remainder waste paper. In general, the stock to be corrugated is heated to a suitable temperature and also made sufficiently moist that the stock will be readily bent to shape when passing between the intermeshing corrugations of the corrugating rolls, but will retain its shape sufficiently for the adhesive operation. Steam is a suitable agent for treating the stock prior to passage through the corrugating rolls, and has been applied in various ways. Mere jets of steam playing on the stock have not produced the best results, since adequate control of the application of steam is necessary. Thus, devices known as "showers" have been developed, for applying steam in controlled quantities to the corrugation stock. One type of shower is known as a "pipe" shower, and consists essentially of a distributing pipe extending in the same direction as the axes of the corrugating rolls and provided with a series of pipes such as spaced about 2 in. apart, extending through the distributing pipe to points close to the path of travel of the corrugating stock as it is fed to the rolls. In addition, a shield or baffle disposed adjacent the ends of the steam discharge pipes tends to spread the steam over the paper stock. A "pipe shower" has been found generally adequate to apply steam to the upper surface of the corrugation stock, but the application of steam merely to the upper surface is generally insufficient. Thus, steam has also been simultaneously applied to the under side of the corrugation stock, but a so-called "pipe shower" has not been as satisfactory for use in this position as in the upper position, and other types of "showers" have been developed for applying steam to the under side of the corrugation stock. One type of under shower used extensively is the so-called "Gaylord" shower, which consists essentially of a relatively large tubular housing cut away along longitudinal lines to leave approximately one upper quadrant open. In this quadrant is placed a steam header and a horizontal baffle plate at right angles thereto, the steam being led from the header through curved nozzles, such as spaced about 3 in. to 4 in. apart, which direct the steam against the baffle plate, from which it is spread upwardly into contact with the paper stock. In addition, between each successive nozzle, a guide for the paper stock extends transversely to both the steam header and the baffle and has an arcuate exterior to complete the circle of the housing and form guides for the stock at spaced points along the shower. In effect, this so-called "Gaylord" shower may be considered to be separate steam applying chambers in each of which the steam is directed first against the baffle and from there to the paper stock.

Despite the above improvements, the results of corrugating operations are not always uniform and, in general, have not been controlled with sufficient accuracy that the ultimate capacity of the machine could be achieved. Sometimes the corrugation stock is not heated to the right temperature or does not have the correct moisture content for the subsequent operations, thus resulting in rejections due to "fluffing" or broken down corrugations, or breakage of stock which necessitate a shut down of the machine, or separation of the corrugated layer from the liner. Thus, corrugation stock which, after steam treatment, is too soft or too hard or has insufficient heat therein to insure a good gluing operation, either over the entire stock or only portions thereof, is undesirable. Also, the corrugated layer may have so-called "finger marks" which may result in an inferior product.

Among the objects of the present invention are to provide a machine for producing corrugated paper in which heat and moisture are applied, preferably through the medium of steam, to the corrugation stock and in which the application of the steam is more uniform, is more readily controlled, and results in adequate steam treatment and heating of the corrugation stock; to provide such a machine in which the feeding of stock to the rolls is guided accurately, as when a new roll of corrugation stock is introduced into the machine; to provide such a machine in which parts added in accordance with this invention are adapted to co-operate with parts of prior machines; to provide such a machine in which such added parts do not interfere unduly with access to the various parts of the machine; and to provide such a machine in which successful and more nearly trouble-free operations are given substantial insurance.

Figure 2:
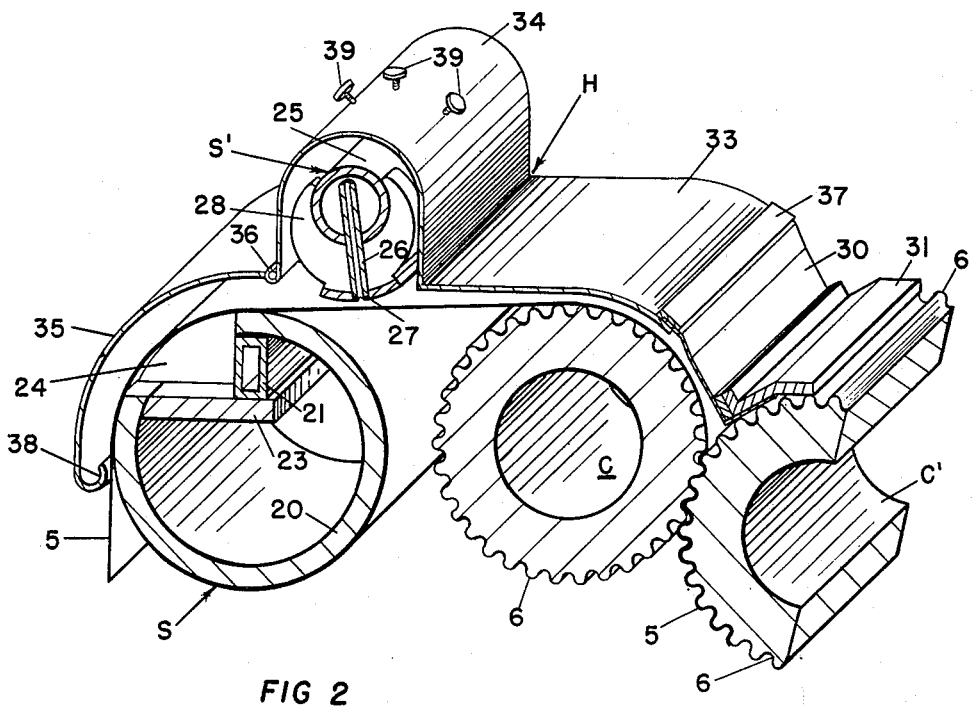

Additional objects and the novel features of this invention will become apparent from the description which follows, taken in connection with the accompanying drawing, in which:

Fig. 1 is a vertical section, partly diagrammatic, of certain essential operating parts of a machine for corrugating paper provided with the improvement of this invention; and Fig. 2 is a three-dimensional sectional view, on an enlarged scale, of a portion of the parts shown in Fig. 1.

As illustrated in Fig. 1, a machine for corrugating paper to which the principles of the present invention may be applied, includes a first corrugating roll C and a second corrugating roll C' intermeshing therewith, the two rolls being rotated in opposite directions about parallel axes, with the second roll C' being disposed slightly below the first corrugating roll C. The corrugating rolls C and C' are preferably hollow, as shown, so that steam or other suitable heating medium may be passed therethrough to maintain the rolls at a sufficient temperature, such as 330° F. to 355° F., that the steam-treated corrugation stock 5 will not be unduly cooled. The stock 5 passes around the top of the first roll C and then between the rolls C and C', the corrugations therein being formed by the intermeshing corrugations 6, extending longitudinally of the periphery of each of the rolls C and C'. As will be evident, due to passage between the rolls C and C' the stock 5 will then become a corrugated layer 5', and stock 7, to provide a liner for the corrugated layer 5' is fed to the opposite side of the second corrugating roll C', around a pressure roll 8 which presses the liner 7 against one side of the corrugated layer 5', to which glue or any other suitable adhesive has already been applied, as by a glue transfer roll 9, which rotates in engagement with both the side of the corrugated layer 5' and also with a glue roll 10, which, in turn, rotates in a bed or body of glue contained in a glue pan 11. The glue in the pan 11 is preferably heated to a suitable temperature and maintained at such temperature by suitable means (not shown), while the corrugated layer 5' is held in the corrugations of roll C' by arcuate fingers 12, which extend for a suitable distance around the lower side of roll C', as between roll C and pressure roll 8. A plurality of fingers 12 are preferably provided, spaced along the length of roll C' a suitable distance apart, such as from 2 in. to 4 in., the upper ends of fingers 12 being accommodated by slots 13 in corrugating roll C and the central portion of fingers 12 being accommodated by slots 14 in glue transfer roll 9. The glue roll 10 may also be provided, at spaced points along its length, with rings 15 adapted to engage slots 14 in the glue transfer roll 9, to remove any excess glue tending to accumulate in the slots 14.

It will be evident that, due to the relatively short time of contact between the liner 7 and the corrugated layer 5', when the pressure roll 8 presses the liner against the corrugated layer, the corrugated layer 5' should have the correct stiffness and temperature to insure a completely successful gluing operation. In addition, if the corrugation stock 5, when it passes between the corrugating rolls C and C', is not at approximately the correct temperature or does not have the desired moisture content for the specific type of paper of which it is made, it may tend to break while being corrugated, or the corrugations may lose their shape before they reach the liner 7, or undue pressure of fingers 12 may be necessary to maintain the layer 5' in the corrugations of roll C'. In addition, if the temperature and/or moisture content of the stock 5 tends to vary during a run, continual adjustment of the fingers 12 may be necessary to prevent "finger lines." In general, more leeway, with respect to temperature and moisture content, is ordinarily permissible when 100% wheat straw stock is used for the corrugated layer, but when other materials, such as waste paper, are incorporated in the corrugation stock, the permissible range of temperature and moisture content may be reduced. Of course, to obtain a maximum production from a machine, the optimum conditions must be produced, as closely as possible, at all times.

The corrugation stock 5 may be fed to the machine from a roll of the same (not shown), to pass beneath a guide roll 17, then over a driven feed roll 18, and then under an idler roll 19 before passing over a lower shower S and beneath an upper shower S', and then passing over the first corrugating roll C and between the rolls C and C'. The lower shower S may be the so-called "Gaylord" type, and may comprise a tubular housing 20 cut away substantially along the upper left quadrant thereof, so as to provide an opening through which steam may be applied to the under side of the corrugation stock 5, the steam flowing through a header 21, which is shown as rectangular in shape but may have any desired shape, and from the header through a series of spaced nozzles 22 adapted to direct steam downwardly against a horizontal baffle plate 23 from which the steam is deflected against the under side of the paper. At spaced positions along the lower shower, such as between each of the nozzles 22, a quadrant shaped partition 24, whose outer surface is adapted to guide the stock 5 in its movement around the shower, prevents the paper from tending to sag unduly into the shower space and also tends to concentrate the steam from each of the nozzles 22 upon the portion of the stock 5 adjacent thereto. The upper shower S' may be a so-called "pipe shower" and may include a distributing pipe 25, acting as a steam header, and through the under side of which a plurality of spaced nozzles 26 extend, the lower ends of the nozzles being spaced only a short distance from the path of travel of the corrugation stock 5 and the upper ends of the nozzles extending to a point adjacent the top of the distributing pipe 25, so as to receive as uniform a steam flow as possible. Each of the nozzles 26 may terminate in a central hole in a shield 27 which may extend longitudinally with respect to the distributing pipe 25 but is slightly arcuate transversely and may be attached to the distributing pipe 25 by a series of brackets 28 which may be a separate part or formed integrally with the shield 27. To prevent the operator from having his fingers caught between the rolls, while feeding stock between the rolls C and C', the machine may be equipped with a longitudinally extending finger guard 30, mounted on a bracket 31 and disposed generally just above the point of intermeshing of the rolls C and C', i. e., in the free space between the rolls.

Despite the fact that the hollow interior of the corrugating rolls C nd C', as well as the pressure roll 8, may be heated, the mere passage of the corrugation stock 5 over the lower shower S and beneath the upper shower S', does not necessarily produce the desired results. Thus, neither the heating nor the moisture content of the corrugation stock 5 has been as uniform and accurately controllable as desired.

In accordance with this invention, such a machine for making corrugated paper is provided with a hood H which is disposed over and conforms generally in shape to the lower shower S, the upper shower S' and the top of the first corrugating roll C. The hood H may be made in two sections, the first being a fixed section 33 which extends from the finger guard 30 to the upper shower S' and then over the upper shower S' as a substantially semi-cylindrical portion 34, and the second being a movable section 35 which is arcuate in form and extends from hinge 36 by which the movable section 35 is attached to the lower edge of the semi-cylindrical portion 34, to a point below the opening in the lower shower housing 20. The end of fixed section 33 at finger guard 30 may fit beneath the edge of the finger guard and may be provided with a flange 37 attached thereto and forming a space into which the edge of the finger guard extends. The lower end of the movable section 35 may be provided with a flange 38 on the inside, which may be arcuate in shape or have any other desired form, for receiving and leading off any condensate which might form on the under side of the section 35. The fixed section 33 may be supported on the shower S', as by a series of screws 39, which also may be utilized in adjusting the position of the hood H with respect to the other parts of the machine. The hinge 36 is preferably constructed so that it also acts as a stop limiting the downward movement of the movable section 35, so that the inside of flange 38 will be spaced a small distance from the stock 5.

As will be evident, steam which is discharged onto the upper surface of the stock 5 from the upper shower S' will be spread over the entire upper surface of the stock 5, from the lower edge of the movable section 35 to the lower edge of fixed section 33. This insures not only that the steam will be distributed over a greater surface area of the corrugation stock 5, but also that the stock will be continued to be heated by the steam from the upper shower S' as it passes to and at least partially around the corrugating roll C. Not only does the corrugation stock 5 tend to be heated at all times to sufficient temperature for gluing, but also, due to the greater length of time the stock is in contact with the steam, the moisture content of the stock tends to be increased during this increased contact time. However, the moisture content is increased by contact with steam, rather than droplets of condensate which might tend to produce "spotty" wetting.

The hood H acts also as a guide for inserting stock 5 into the machine, since stock fed around idler roll 19 will tend to be forced against the lower shower S, and when moving further into the machine, will be guided onto the corrugating roll C by fixed section 33, and thence between the rolls. Thus, the hood H not only performs the useful function of distributing more evenly and adequately the steam supplied by the upper shower S', but also acts as a guide in feeding stock to the machine. In addition, with the construction shown, the hood H tends to cause a collection of condensate which might otherwise produce wet spots.

From the foregoing, it will be evident that the machine for producing corrugated paper of this invention fulfills to a marked degree the requirements and objects hereinbefore set forth. The addition of the hood H to machines now in use is relatively easy, and the movable section 35 permits adequate inspection of and access to the lower shower S. The size and form of the hood H may, of course, be varied with individual machines. A less expensive "pipe" shower also can be substituted for the more expensive "Gaylord" shower, as the lower shower S, without impairing the operation or results thereof.

An example of the improved results secured by use of this invention is the production of corrugated paper from 9-point corrugating stock and 16-point liner stock, of various widths between 50 in. and 63 in., utilizing a corrugator of the type described herein. Prior to conversion to utilize the principles of this invention, the maximum speed of the stock was 250 to 275 ft. per min. In addition, shut downs were relatively numerous, and the machine required the constant attention of the foreman or other skilled operator, in adjusting the fingers 12 so as to attempt to prevent "finger lines." After conversion to utilize this invention, the machine could be operated at a stock speed of 350 ft. per min. with a reduction of 66% in steam consumption and with such trouble-free operation that the presence of a skilled operator was unnecessary, except when changing from one width of run to another. In addition, the corrugations were more uniform, with an absence of "finger lines."

Although one embodiment of this invention has been illustrated and described with particularity, it will be understood that other embodiments may exist, and various changes made therein, all without departing from the spirit and scope of this invention.

What is claimed is:

1. In a machine for producing corrugated paper and having first and second elongated, meshing corrugating rolls, means for feeding stock adapted to be corrugated to said rolls, said stock passing over the first corrugating roll, between said rolls, and then around the second said roll, guide fingers disposed in spaced longitudinal relation and extending circumferentially around the lower portion of said second roll and to a point adjacent the point of meshing of said rolls, said first roll having circumferential slots to accommodate the upper ends of said guide fingers, an adhesive pan beneath said corrugating rolls, an adhesive roll for carrying adhesive from said pan, an adhesive transfer roll engaging said adhesive roll and the corrugated stock on the under side of said second corrugating roll, said adhesive transfer roll having circumferential slots to accommodate said guide fingers, a longitudinal finger guard above and extending into the space between said rolls and in spaced relation to said first corrugating roll, means for feeding liner stock to be attached to the corrugated layer to the opposite side of said second roll, including a pressure roll for pressing said liner against said corrugated stock on the side of said second corrugating roll opposite said first corrugating roll, a longitudinally extending, upper shower disposed to the side of and above said first corrugating roll for directing a fluid heating medium against the upper surface of the stock to be corrugated prior to engagement with said first corrugating roll and including a longitudinally extending steam pipe, a series of nozzles in spaced longitudinal relation and extending from the interior of said pipe and downwardly therethrough and a longitudinally extending shield disposed at the lower end of said nozzles, a longitudinally extending, lower shower disposed at the same side of said rolls for directing a fluid heating medium against the lower surface of the stock to be corrugated prior to said upper shower, and including a tubular housing cut away along an upper quadrant opposite said corrugating rolls, a longitudinal steam header in said housing and extending downwardly from the upper edge of said quadrant, a horizontal baffle plate extending inwardly from the lower edge of said quadrant, a series of nozzles in spaced relation for leading steam from said header and directing the same against said baffle plate, and a quadrant shaped block within said quadrant and between successive nozzles, the outer edges of said blocks forming guides engaged by the stock to be corrugated; the improvement which comprises a combined hood and guide extending from said finger guard over said first roll, said upper shower and said lower shower and conforming in general shape thereto, said hood including a fixed section and a movable section, each formed of metal plates, one side of said fixed section extending beneath said finger guard and provided with a flange fitting over said guard and extending to the upper shower in spaced relation to said first corrugating roll, a portion of said fixed section being substantially cylindrical and extending over said pipe of said upper shower, said movable section extending from said fixed section outwardly and downwardly in spaced relation to said lower shower and to a point below said quadrant of said lower shower, the lower edge of said movable section having an inwardly and upwardly extending, longitudinal flange; a series of screws for engaging said upper shower pipe and mounting said fixed section thereon; and a longitudinal hinge joint in said hood connecting said fixed and movable sections, to permit the portion of said hood above said lower shower to be lifted without moving the remainder of said hood, said longitudinal joint also maintaining said movable section in spaced relation to said lower shower.

2. In a machine for producing corrugated paper and having first and second elongated, meshing corrugating rolls, means for feeding stock adapted to be corrugated to said rolls, said stock passing over the first corrugating roll, between said rolls, and then around the second said roll, means for feeding liner stock to be attached to the corrugated layer on the opposite side of said second roll, means for supplying an adhesive to one side of the corrugated stock prior to contact with the liner to be attached thereto, a longitudinally extending, upper shower disposed to the side of said first corrugating roll for directing a fluid heating medium against the upper surface of the stock to be corrugated prior to engagement with said first corrugating roll, and a longitudinally extending, lower shower disposed at the same side of said rolls for directing a fluid heating medium against the lower surface of the stock to be corrugated prior to said upper shower; the improvement which comprises a combined hood and guide extending over said first roll, said upper shower and said lower shower and conforming in general shape thereto; and a longitudinal joint in said hood disposed in the space between said upper and lower showers to permit the portion of said hood above said lower shower to be lifted without moving the remainder of said hood.

3. In a machine for producing corrugated paper and having first and second elongated, meshing corrugating rolls, means for feeding stock adapted to be corrugated to said rolls, said stock passing over the first corrugating roll, between said rolls, and then around the second said roll, a longitudinal finger guard above and extending into the space between said rolls and in spaced relation to said first roll, means for feeding liner stock to be attached to the corrugated layer on the opposite side of said second roll, means for supplying an adhesive to one side of the corrugated stock prior to contact with the liner to be attached thereto, a longitudinally extending, upper shower disposed to the side of said first corrugating roll for directing a fluid heating medium against the upper surface of the stock to be corrugated prior to engagement with said first corrugating roll, and a longitudinally extending, lower shower disposed at the same side of said rolls for directing a fluid heating medium against the lower surface of the stock to be corrugated prior to said upper shower; the improvement which comprises a combined hood and guide extending from said finger guard and over said first roll, said upper shower and said lower shower and conforming in general shape thereto; a longitudinal joint in said hood disposed in the space between said upper and lower shower to permit the portion of said hood above said lower shower to be lifted without moving the remainder of said hood; and means for supporting said hood from said finger guard and upper shower.

4. In a machine for producing corrugated paper, as defined in claim 3, wherein the lower edge of said hood adjacent said lower shower is provided with a longitudinal flange extending inwardly and upwardly.

5. In a machine for producing corrugated paper and having first and second elongated meshing corrugating rolls, means for feeding stock adapted to be corrugated to said rolls, said stock passing over the first corrugating roll, between said rolls, and then around the second said roll, means for feeding liner stock to be attached to the corrugated layer to the opposite side of said second roll, means for supplying an adhesive to one side of the corrugated stock prior to contact with the liner to be attached thereto, a longitudinally extending, upper shower disposed to the side of said first corrugating roll for directing a fluid heating medium against the upper surface of the stock to be corrugated prior to engagement with said first corrugating roll, and a longitudinally extending, lower shower disposed at the same side of said rolls for directing a fluid heating medium against the lower surface of the stock to be corrugated prior to said upper shower; the improvement which comprises a combined hood and guide extending over said first roll, said upper shower and said lower shower and conforming in general shape thereto; and a longitudinal joint in said hood disposed in the space between said upper and lower shower to permit the portion of said hood above said lower shower to be lifted without moving the remainder of said hood, the lower edge of said hood adjacent said lower shower having an inwardly and upwardly extending flange.

6. In a machine for producing corrugated paper and having first and second elongated, meshing corrugating rolls, means for feeding stock adapted to be corrugated to said rolls, said stock passing over the first corrugating roll between said rolls, and then around the second said roll, means for feeding liner stock to be attached to the corrugated layer on the opposite side of said second roll, means for supplying an adhesive to one side of the corrugated stock prior to contact with the liner to be attached thereto, a longitudinally extending, upper shower disposed to the side of said first corrugating roll for directing a fluid heating medium against the upper surface of the stock to be corrugated prior to engagement with said first corrugating roll, and a longitudinally extending, lower shower disposed at the same side of said rolls for directing a fluid heating medium against the lower surface of the stock to be corrugated prior to said upper shower; the improvement which comprises a combined hood and guide extending over said first roll, said upper shower and said lower shower and conforming in general shape thereto.

References Cited in the file of this patent

UNITED STATES PATENTS

| Number | Name | Date |
|---|---|---|
| 1,473,096 | Hill et al. | Nov. 6, 1923 |
| 1,642,782 | Langston | Sept. 20, 1927 |
| 2,065,576 | George | Dec. 29, 1936 |
| 2,192,432 | Bruker | Mar. 5, 1940 |